Jan. 2, 1945. W. F. PECK ET AL 2,366,554
EYE TESTING APPARATUS
Filed April 10, 1942 5 Sheets-Sheet 1

INVENTOR
WILLIAM F. PECK
ALBIN A. GRADISAR
BY Louis L. Gagnon
ATTORNEY

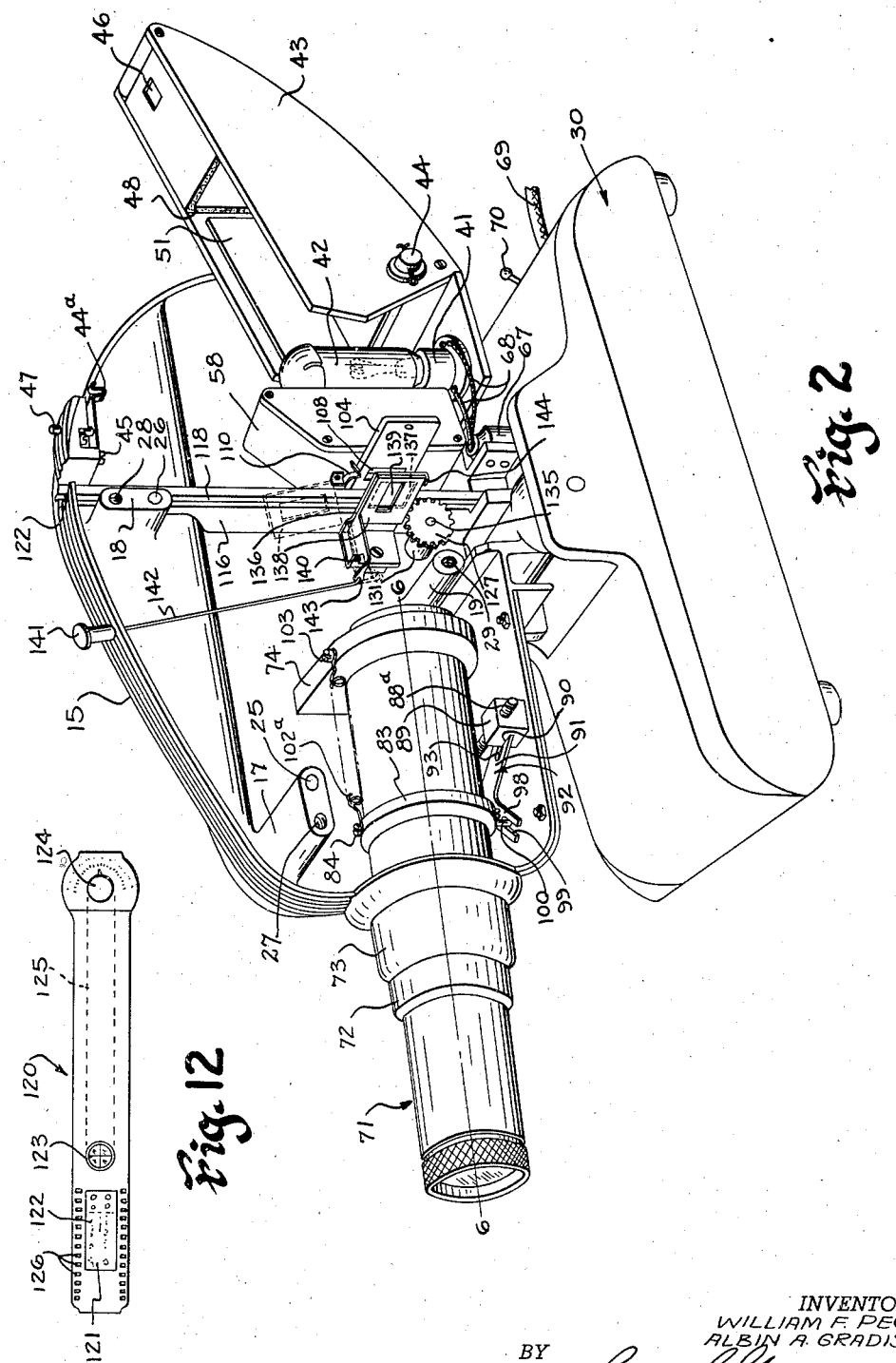

Jan. 2, 1945.   W. F. PECK ET AL   2,366,554
EYE TESTING APPARATUS
Filed April 10, 1942   5 Sheets-Sheet 4

INVENTOR
WILLIAM F. PECK
ALBIN A. GRADISAR
BY Louis L. Gagnon
ATTORNEY

Patented Jan. 2, 1945

2,366,554

UNITED STATES PATENT OFFICE 2,366,554

EYE TESTING APPARATUS

William F. Peck, Snyder, and Albin A. Gradisar, Buffalo, N. Y., assignors to American Optical Company, Southbridge, Mass., a voluntary association of Massachusetts Application April 10, 1942, Serial No. 438,376

8 Claims. (Cl. 88—24)

This invention relates to improvements in eye testing apparatus, and has particular reference to projection type of apparatus.

One of the principal objects of the invention is to provide an improved apparatus for projecting matter upon a screen for the purpose of testing vision and for arranging charts in such a manner that they may conveniently be projected in the accepted manner for test purposes.

Another important object of the invention is to provide means for more accurately and quickly setting the objective lens system to proper focus, and being so constructed that different objective systems may be interchanged to suit the different requirements of the examiner.

Another object is to provide means whereby certain parts of the test slides may be quickly and easily blocked out.

Another object of the invention is to provide simple and efficient means for tilting or elevating the apparatus to any desirable position, and having means whereby the apparatus may be interchangeably used with either a floor stand or a table stand as desired.

Another object of the invention is to provide means whereby the vertical test slide may be adjusted from either side of the instrument.

Other objects and advantages of the invention will become apparent from the following description taken in connection with the accompanying drawings, and it will be apparent that many changes may be made and in the details of construction and arrangement of parts shown and described, without departing from the spirit of the invention as expressed in the accompanying claims.

We, therefore, do not wish to be limited to the exact details and arrangement of parts as the preferred form only has been shown by way of illustration.

Referring to the drawings:

Fig. 2 is a perspective view of the projector with one side wall thereof removed;

Fig. 12 is a side view of a vertical test slide.

Figure 1:
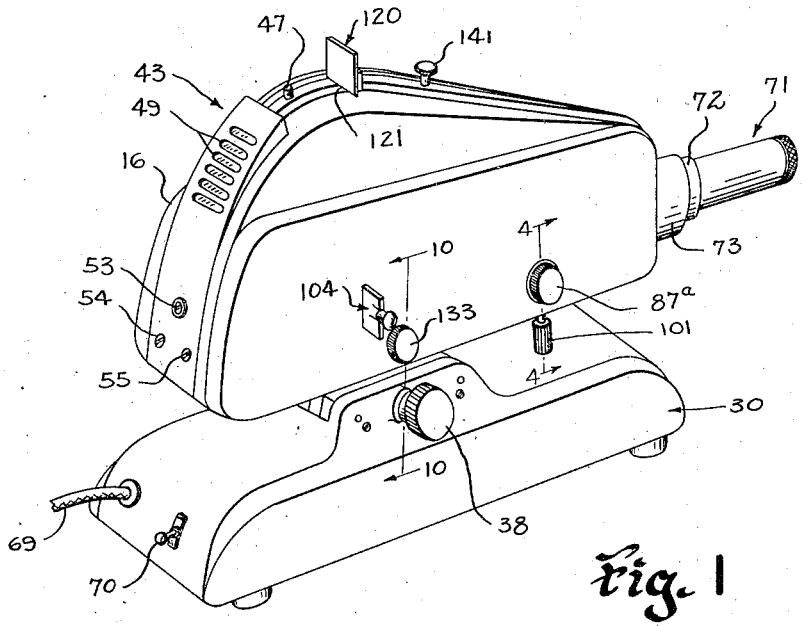
Fig. 1 is a perspective view of the projector embodying the invention.

In the past, with instruments of this nature, great difficulty was encountered in setting the objective lens system to the proper focus.

In most instances this was accomplished by manually grasping and moving one tube of the objective relative to another. It was essential that the fit between the two tubes be such that the tubes would not bind and yet not be too loosely related.

If the fit was too tight it was difficult to adjust, if too loose a slight bump or jar would move the objective out of adjustment.

Another difficulty with projectors of this nature was that the slides could be adjusted only from one side of the projector and further difficulty was also encountered in retaining the projector in desired tilted position.

The present invention is directed to overcoming all of the above difficulties as well as providing other new and novel features. These features will become apparent from the following specification taken in conjunction with the drawings.

Referring more particularly to the drawings wherein like characters of reference designate like parts throughout the several views, the device embodying the invention as shown in Figs. 1 to 12 inclusive comprises a casing 15 and a cover 16 in which the various mechanisms are assembled. The casing 15 is provided with suitable raised bosses 17, 18 and 19 internally thereof. These bosses are adapted to line up with similar raised bosses 20, 21 and 22 located internally of the cover 16, when in assembled relation therewith. To help in assembling these parts, suitable locating pins 23 and 24 have been provided in the bosses 20 and 21 of the cover 16, these locating pins 23 and 24 are adapted to index in suitable holes 25 and 26 located in the bosses 17 and 18 of the casing 15. The casing 15 and cover 16 are then secured together by means of screws at 27, 28 and 29. It is apparent that access may be had to the various mechanisms of the instrument by the removal of the three screws.

The casing 15 with the cover 16 attached thereto is pivotally and adjustably mounted on a suitable base 30, as shown in Figs. 1 and 2. The base 30 shown in Figs. 1 and 2 is a table model, but it is to be understood that this instrument is adapted to be interchangeably used on a floor stand as well.

The casing 15 has a depending flange 31 which supports a bearing 32. The bearing 32 is adapted to be held between two upright flanges 33 and 34 of the base 30 by means of a threaded stud 35. The stud 35 has a reduced end portion 36 which is adapted to fit into an opening 37 of the upright flange 33. At its opposed end the threaded stud 35 is supported through an opening in the upright flange 34. A suitable hand knob 38 is attached to the end of the threaded stud 35. The depending flange 31 has a serrated outer face 39 which engages a member 40 of leather, fibre or other suitable material. The member 40 may or may not be secured to the upright flange 34 by means of cement or the like. It will thus be seen that by loosening the knob 38 the serrated face on the depending flange 31 will be loosened from its frictional engagement with the member 40 and the instrument may be pivoted to any desired angular adjustment. When the instrument is in the desired angular adjustment the hand knob 38 is tightened; this will bring the serrated face 39 into frictional engagement with the member 40 and thus lock the instrument in desired position.

A lamp socket 41 adapted to hold a suitable lamp 42 is mounted inside the casing 15 adjacent one end thereof. The lamp 42 is enclosed by a pivoted lamp housing 43. The lamp housing 43 is pivotally mounted on the casing 15 by a pivot pin 44. The lamp housing 43 is shown in open position in Fig. 2 and means are shown whereby the lamp housing may be held in closed position. These means consist of a spring clip 44a which is attached to the casing 15 by means of a screw 45 or other suitable means. The spring clip 44a is adapted to latch in a suitable opening 46 in the lamp housing 43. The spring clip 44a may be unlatched from the opening 46 by means of a compressible pin 47. The lower end of the pin 47 bears upon the spring clip 44 between the screw 45 and the latching end which contacts the opening 46. The upper end of the pin 47 extends through the casing 15 where it is accessible to the operator. It will thus be seen that by pressing downwardly on the pin 47 that the spring clip 44a will be moved and the latching end will be disengaged from the opening 46.

The upper portion of the lamp housing 43 is preferably lined with asbestos or other suitable material 48 for insulation against heat which is caused by the lamp 42. There are suitable slots 49 formed in the lamp housing for ventilation and for allowing the heat caused by the lamp 42 to escape.

Figure 11:
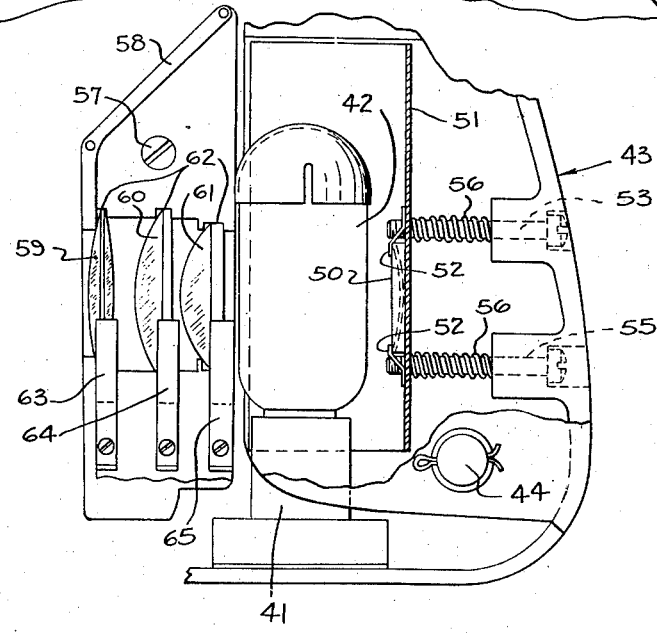
Fig. 11 is a side view of the lamp housing with parts broken away to show the condensing lens system, lamp and beam reflector.

A light beam reflecting member 50, as shown in Fig. 11, is supported within the lamp housing 43 by an adjustable support 51. The member 50 is secured to the adjustable support 51 by means of clips or the like 52. The reflector support 51 is made substantially U shape in cross section with its two side walls adapted to partially surround the lamp 42. These side walls are spaced from the outer walls of the lamp housing 43 and tend to keep the heat from said walls while the heat rises towards the ventilation slots 49. The U shaped reflector support is adjustably supported within the lamp housing 43 by means of the screws 53, 54 and 55. The screws 53, 54 and 55 are supported by suitable bosses in the lamp housing 43 and are threadably connected with the U shaped member 51. Coil springs 56 are carried by the screws 53, 54 and 55 between the reflector support 51 and the bosses of the lamp housing 43. The springs 56 are adapted to urge the U shaped reflector support 51 in a direction away from the bosses in the lamp housing 43 to retain said U shaped member in adjusted position relative to the lamp 42. The screws 53, 54 and 55 are positioned in substantially triangular form as shown in Fig. 1, thus making it possible to adjust the reflecting member 50 either vertically or horizontally to reflect the beam of light in the proper direction.

Supported within the casing 15, adjacent the lamp 42, by a screw 57, is a boxlike member 58. This boxlike member has mounted therein the condensing lenses 59, 60 and 61. These lenses are held in spaced relation with each other in suitable slots 61. The lenses 59, 60 and 61 are held in the slots 65 by the flat springs 63, 64 and 65. With this construction it will readily be seen that the lenses can be quickly and easily removed for cleaning or other purposes.

The boxlike member 58 is open on the side adjacent the lamp 42, and has an aperture 66 in the opposite side thereof. The opening 66 is provided to allow the light beam coming from the lamp 42, through the condensing lenses 59, 60 and 61 to continue into other parts of the instrument. These parts will be expalined later in the specification.

An electrical plug 67 is attached to the casing 15 adjacent the lamp 42 and has wires 68 which are connected to the lamp socket 41. The plug 67 is adapted to be contacted by a plug located in the base 30, which receives electrical current through the wire 69 from any suitable source. A control switch 70 is located on the outer side of the base 30. The object of having the plug 67 in the casing 15 is so that the instrument can be interchangeable with different bases, without disturbing the wiring.

Figure 6:
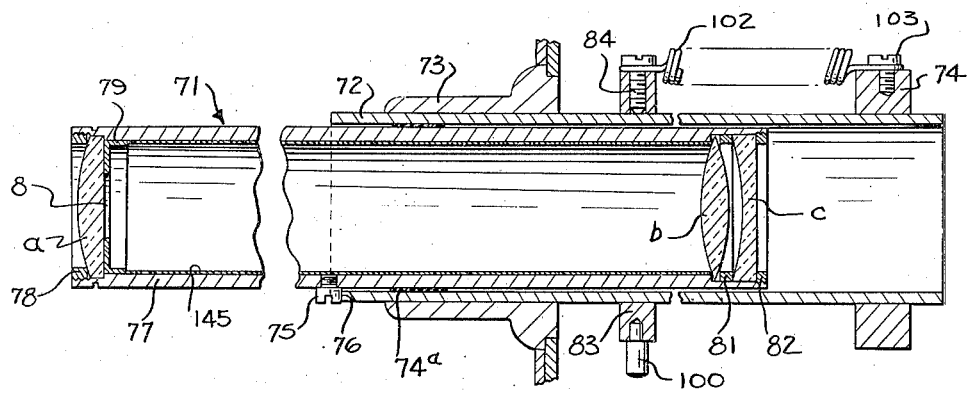
Fig. 6 is a section through the objecting system showing it in its assembled relation with the supporting tube and holding ring.
Figure 7:
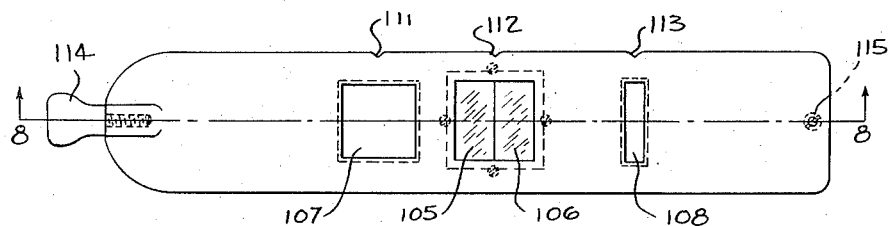
Fig. 7 is a side view of a horizontal test slide used with the projector.
Figure 8:
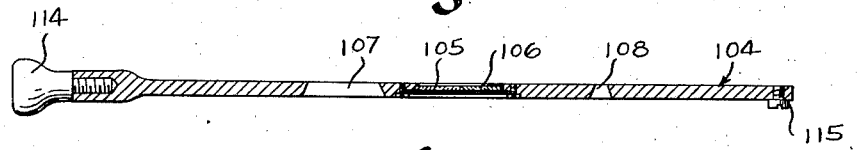
Fig. 8 is a sectional view taken on line 8—8 of Fig. 7.
Figure 9:
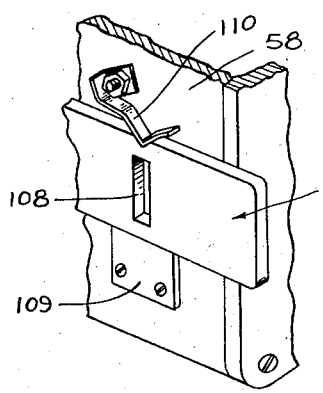
Fig. 9 is a fragmentary perspective view showing the means for locating or indexing the horizontal test slide.
Figure 10:
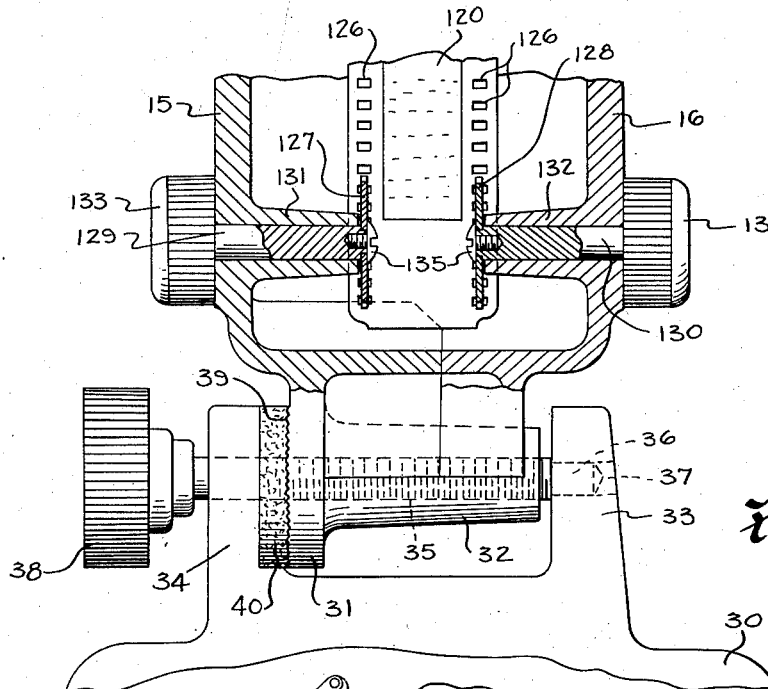
Fig. 10 is a sectional view taken on line 10—10 of Fig. 1 and looking in the direction indicated by the arrows and showing the means for adjusting the vertical slide from both sides of the instrument and means for controlling the elevation of the instrument.

The objective system 71 is slidably held in proper optical alignment with the lamp 42 and the condensing lenses by the objective supporting tube 72. The objective supporting tube 72 is supported in the instrument by suitable bearings 73 and 74 on the casing 15. Between the supporting tube 72 and the objective system 71 there is provided a felt band 74a positioned internally of the supporting tube 72 as shown in Fig. 6. The objective system 71 has a locating pin or screw 75 which is located on the outer tubular casing 77 in proper spaced relation from the outer end of said casing and in proper axial relation with the lenses. The pin or screw 75 is adapted to index in a suitable slot 76 in the supporting tube 72, thus causing the objective system to be held in proper position in the instrument.

The objective system is of a standard type well known in the art and consists of a series of lenses a, b and c which are adapted to enable the desired focus to be obtained. As shown in Fig. 6 the lens *a* is held into position against an internal shoulder at one end of a tubular casing 77 by means of a threaded ring 78. Abutting the lens *a* on its inner surface is an apertured collar 79 having an aperture 80 which is adapted to restrict the size of the light beam. The lenses *b* and *c* are assembled in the opposite end of the tubular casing 77 against an internal shoulder therein. These lenses are separated by the spacer member 81, and are held in place by a threaded ring 82. The objective tube 71 has a lining 145 of dull black surfaced paper to control the uniformity of illumination.

Figures 4, 5:
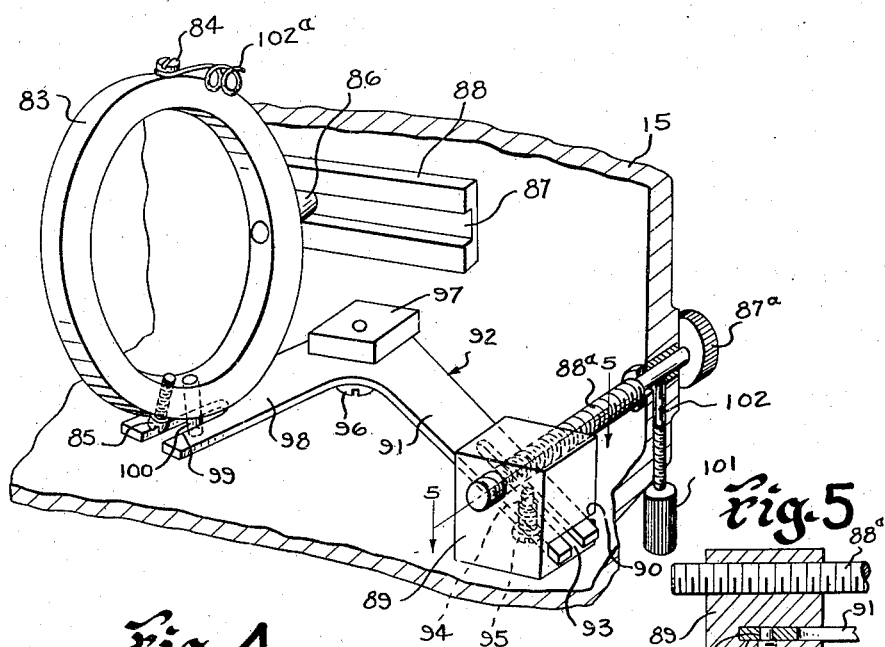
Fig. 4 is an enlarged fragmentary perspective view showing the objective holding ring and means for adjusting same.
Fig. 5 is a fragmentary sectional view taken on line 5—5 of Fig. 4 and looking in the direction indicated by the arrows.
Figure 3:
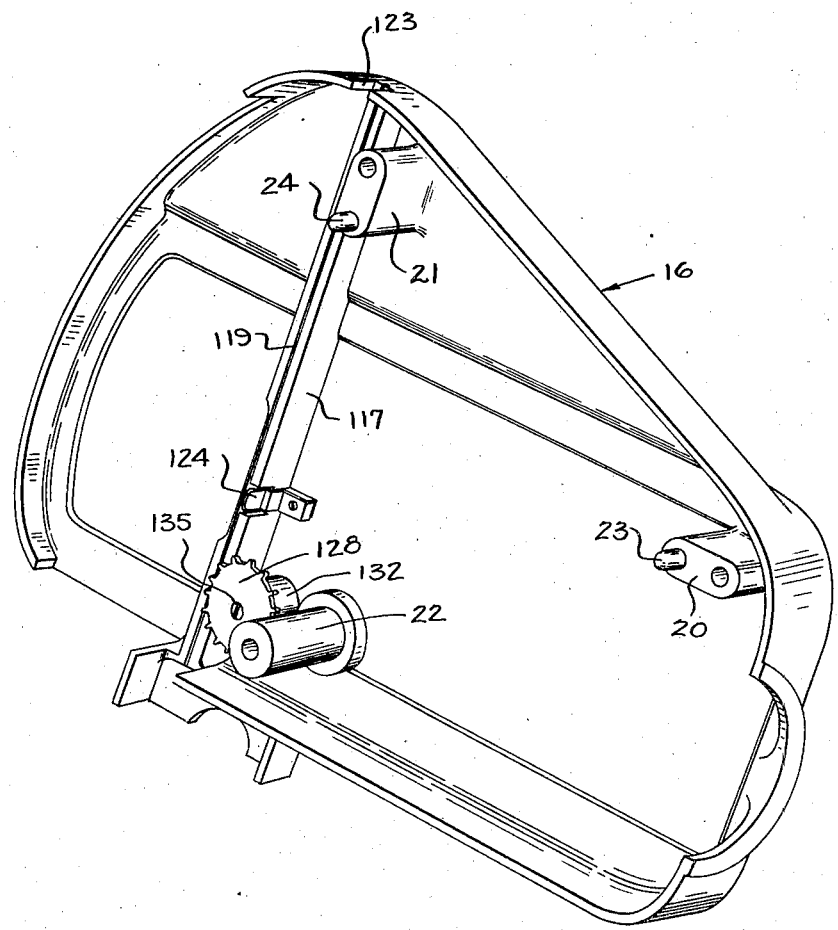
Fig. 3 is a perspective view of the removed side wall.

The objective supporting tube 72 has an adjusting collar 83 rigidly mounted thereon in proper position intermediate the ends of said tube by means of screws or the like 84 and 85. The objective supporting tube 72 is held in the proper axial position by means of a pin 86, see Fig. 4, which extends from the adjusting collar 83, and is adapted to slide in a horizontal slideway 87, as shown in Fig. 4. The horizontal slideway 87 is formed in a boss 88 on the inner side of the casing 15.

The objective lens system 71 which is supported within the objective supporting tube 72 is adjusted to the proper focus by means of an adjusting knob 87a, which is located on the exterior of the casing 15, on the end of an adjusting screw 88a. The adjusting screw 88a has a block 89 threadably attached thereto which is adapted to be moved along the adjusting screw 88 by rotation thereof. The block 89 has a slot 90 which is adapted to receive the end portion of the arm 91 of a bell crank 92. The arm 91 of the bell crank 92 has a longitudinal slot 93 in its end portion lying within the slot 90. The slotted end 93 is adapted to receive the reduced end portion 94 of a screw 95 attached to the block with the end 94 extending in said slot 90. The bell crank 92 is pivotally held by a screw 96 to a suitable boss 97 formed on the inside of the casing 15. The arm 98 of the bell crank 92 has a slotted portion 99 in the end thereof, which is adapted to fit around a pin 100 carried by the adjusting collar 83.

By means of this mechanism it will be seen that by turning the knob 87a attached to the adjusting screw 88, it will cause the block 89 to travel along the adjusting screw 88a. This will cause the reduced end 94 of the screw 95 which extends into the slot 93 of the bell crank arm 91 to actuate the arms 91 and 98 of the bell crank about the pivot 96. The pin 100 extending from the adjustable collar 83 into the slot 99 of the bell crank arm 98 will thereby cause the said collar to be moved in a direction rearwardly or forwardly of the casing 15 depending upon the direction of rotation of the knob 87a. The objective supporting tube 72 and objective system 71 to which the adjusting collar 83 is attached will therefore be moved to obtain the proper focus.

Means have been provided for locking the objective system when in the proper focus. This is accomplished by means of a locking screw 101, which has a reduced end 102 that is adapted to bind against the adjusting screw 88a. To eliminate any possible backlash in this mechanism a spring 102 is provided. The spring 102a is attached at one end to the screw 84 on the adjusting collar 83 and at its opposite end to a screw 103 on the bearing 74.

It will be seen that by this mechanism the objective system may be quickly and easily adjusted to the proper focus.

Suitable slots are provided in the casing 15 and cover 16 whereby a suitable horizontal slide 104 may be introduced into the instrument. This slide 104 is adapted to intercept the beam of light, between the light source and the objective system. The horizontal slide 104 has certain means, such as the red and green glass screens 105 and 106 and tapered openings 107 and 108 shown in Figs. 7 and 8. These means are adapted to be positioned in the beam of light as the examiner desires. The test slide 104 is supported by and adapted to slide upon a block 109 which is secured to the condensing lens system housing 58. A blade spring 110 is attached to the condensing lens system housing 58 in spaced relation with the block 109. The slide 104 is adapted to slide between the block 109 and the spring 110. The spring member 110 has a V-like bend, the apex of which contacts the upper longitudinal edge of the horizontal slide 104 and is adapted to index in suitable indents 111, 112 and 113 along said edge to locate the different means in said slide in proper position in the light beam. The slide 104 has a knob 114 attached at one end thereof for adjusting the slide to different positions. A screw 115 is located at the opposite end when the slide is in the instrument. This is to keep the slide from accidently being pulled out.

On the inside of the casing 15 and the cover 16 in vertical alignment with each other are spaced ribs 116 and 117, which extend substantially the full height thereof. These spaced ribs provide channels or grooves 118 and 119 extending longitudinally thereof. The grooves 118 and 119 are adapted to slidably hold a suitable vertical test slide 120.

The vertical test slide 120 is introduced into the instrument through a slot 121. This slot is formed by the communicating recesses 122 and 123 respectively of the casing 15 and the cover 16, when in assembled relation. The vertical test slide is held frictionally in the channels or grooves 118 and 119 by means of a flat spring 124 shown in Fig. 3. The spring 124 is attached to a raised boss on the cover 16 adjacent the rib 117. The rib 117 has a cut out portion to allow the spring to contact the vertical test slide 120.

The vertical test slide 120, as shown in Fig. 12, is of the type disclosed in United States Letters Patent #2,065,430 issued December 22, 1936, to J. R. Cohen. This test slide comprises a transparent plate 121 which carries suitable test characters 122 for testing visual acuity and an astigmatic chart for testing astigmatism. The astigmatic chart is remotely controlled by a knob 124, through a belt 125. The test chart 120 has a series of spaced apertures 126 adjacent the opposed edges of the slide which are adapted to fit within the channels or grooves 118 and 119.

The test slide 120 is adapted to be adjusted vertically to place the different charts in the desired position relative to the light beam, so that the desired test characters may be projected onto a suitable screen. The apertures 126 are adapted to engage sprocket wheels 127 and 128. These sprockets are mounted on the ends of suitable aligned shafts 129 and 130 by means of screws or the like 135. The shafts 129 and 130 are rotatably mounted in the bearings 131 and 132 on the casing 15 and cover 16 respectively adjacent the ribs 116 and 117. There are suitable control knobs 133 and 134 mounted on the outer ends of the respective shafts 129 and 130 for adjusting the slide 120 vertically. It will therefore be seen that the vertical test slide can be readily adjusted from either side of the instrument. It will also be noted that when the cover 16 is removed, the sprocket wheel 128, control knob 134 and the associated parts will remain fixed to the cover 16.

A test chart framing member 136 as shown in Fig. 2 is attached to the casing 15 adjacent the rib 116, and has a framing opening 137 in alignment with the beam of light. This member 136 is substantially L shaped, with one side contacting the inner surface of the casing 15 and rigidly secured thereto by screws or other suitable means. The portion of the member 136 having the framing opening 137 therein extends across the beam of light and is adapted to frame or outline a portion of the test chart which is to be projected.

When it is desired to block out other parts of the test chart within the area of the framing opening 137 to permit only a single line of test characters to be projected a member 138 is swung into place adjacent the framing member 136. The member 138 is provided with an aperture 139 which is adapted to substantially line up with the aperture 137 of the framing member 136 when swung into aligned position therewith. The aperture 139 is smaller than the aperture 137 thus blocking out all except the single line to be projected. The member 138 is pivotally mounted on the member 136 on a pin 140, and is adapted to be pivoted into and out of alignment with the framing aperture 137 by means of a control knob 141. The control knob 141 is attached to a rod 142 which is connected to an extending lip portion 143 on the member 138. The control knob 141 is located exteriorly of the casing 15 where it will be readily accessible to the operator.

Movement is imparted to the member 138 by raising or lowering the knob 141. A lip 144 extending from the member 136 is provided for the member 138 to seat upon when in position in alignment with the light beam. When not in use the member 138 will be raised and will rest against the inside of the casing 15.

It will thus be seen that simple and efficient means have been provided whereby a single line aperture can quickly and easily be placed in position with the test chart.

From the foregoing description taken in conjunction with the drawings, it will be seen that we have provided simple, economical and efficient means for obtaining all the objects and advantages of the invention.

Having described our invention, we claim:

1. An apparatus of the character described comprising a base having spaced uprights thereon, a projection housing having a pivot bearing portion with a threaded bore interposed between said uprights, means having a threaded portion extending within the threaded bore for pivotally connecting said pivot bearing portion to the uprights, one of said uprights and said pivot bearing portion having side surface relation with each other, one of said surfaces having an interrupted contour, a friction washer-like member of yieldable material interposed between said adjacent side surfaces and means for rotating said means having the threaded portion to move the bearing portion of the housing toward the friction-like washer for clamping the said surface of irregular contour in binding relation with said friction-like washer and with the adjacent upright portion to hold the projector in adjusted position relative to the base.

2. An apparatus of the character described comprising a projector having a light source, means for producing a beam of light, means for focusing said light, a slideway located intermediate said light source and said focusing means adapted to receive a slide having spaced serrations adjacent the opposed longitudinal edges thereof and spaced independently operable means each having a sprocket member for engaging the respective serrations of said slide when in position in said slideway and each having a portion extending outwardly of the apparatus on opposite sides thereof and each being separately operable for moving the slide longitudinally of the slideway whereby the slide may be operated from the opposite sides of the apparatus.

3. An apparatus of the character described comprising a housing having a light source therein, means for producing a projected beam of light and means for focusing said light, said focusing means comprising a pair of spaced bearings internally of the apparatus, a tubular member slidably supported in said bearing, a resilient member, attachment means on said tubular member to which one end of said resilient member is secured and means on one of said bearing members to which the opposed end of the resilient member is secured for normally urging said tubular member in a direction inwardly of said apparatus, a slideway in the apparatus extending in a direction longitudinally of the tubular member, means on said attachment means fitting within said slideway, a bell crank pivotally supported in said apparatus, said bell crank having longitudinally slotted portions adjacent the ends thereof, means on said attachment means extending inwardly of one of said slots, a block on the opposed ends of said bell crank having a pin-like portion extending inwardly of the slot of said end and having a threaded opening therein substantially normally disposed relative to the longitudinal axis of the pin-like member, a screw-like member rotatably supported on the apparatus having a threaded portion extending within the threaded opening of the block and having an adjusting knob adjacent the opposed end outwardly of the apparatus whereby threaded movement of the block longitudinally of the threaded portion of the adjusting screw will cause the bell crank to move about its pivot and simultaneously move the attachment means and the tubular member to which it is secured in a direction longitudinally of the spaced bearing members, a second tubular member in telescopic relation with the first tubular member and a projection lens system carried by said second tubular member.

4. An apparatus of the character described comprising a housing having a light source therein, means for producing a projected beam of light and means for focusing said light, said focusing means comprising a pair of spaced bearings internally of the apparatus, a tubular member slidably supported in said bearing, a resilient member, attachment means on said tubular member to which one end of said resilient member is secured and means on one of said bearing members to which the opposed end of the resilient member is secured for normally urging said tubular member in a direction inwardly of said apparatus, a slideway in the apparatus extending in a direction longitudinally of the tubular member, means on said attachment means fitting within said slideway, a bell crank pivotally supported in said apparatus, said bell crank having longitudinally slotted portions adjacent the ends thereof, means on said attachment means extending inwardly of one of said slots, a block on the opposed ends of said bell crank having a pin-like portion extending inwardly of the slot of said end and having a threaded opening therein substantially normally disposed relative to the longitudinal axis of the pin-like member, a screw-like member rotatably supported on the apparatus having a threaded portion extending within the threaded opening of the block and having an adjusting knob adjacent the opposed end outwardly of the apparatus whereby threaded movement of the block longitudinally of the threaded portion of the adjusting screw will cause the bell crank to move about its pivot and simultaneously move the attachment means and the tubular member to which it is secured in a direction longitudinally of the spaced bearing members, a second tubular member in telescopic relation with the first tubular member and a projection lens system carried by said second tubular member and means for securing said screw-like adjustment means in a fixed adjusted position.

5. An apparatus of the character described comprising a projector having spaced bearing portions for supporting the focusing means thereof, one of said bearing portions having a relatively large surface bearing as compared with the other of said bearing portions, a tubular member slidably supported in said spaced bearing portions, means on said tubular member for normally urging said tubular member towards one of said bearing portions, motion transfer means having a portion extending outwardly of the apparatus adapted to be rotated, said motion transfer means embodying a lever connected with said portion extending outwardly of the apparatus and with the tubular member and having characteristics for greatly amplifying said rotary movement functioning in opposition to the resilient means and for adjusting said tubular member longitudinally of said bearing portions and a second tubular member containing a focusing system slidably supported in said tubular member.

6. An apparatus of the character described comprising a projector having spaced bearing portions for supporting the focusing means thereof, one of said bearing portions having a relatively large surface bearing as compared with the other of said bearing portions, a tubular member slidably supported in said spaced bearing portions, means on said tubular member for normally urging said tubular member towards one of said bearing portions, motion transfer means having a portion extending outwardly of the apparatus adapted to be rotated and interconnected with lever means which is in turn connected with said tubular member, said lever means being so controlled as to greatly amplify said rotary movement functioning in opposition to the resilient means for adjusting said tubular member longitudinally of said bearing portions, a second tubular member containing a focusing system slidably supported in said tubular member, said second tubular member having reflection reducing means internally thereof.

7. A focusing system for a device of the character described comprising a pair of telescopically arranged tubular members, one of which has a lens system therein, said tubular members being slidably supported as a unit in bearing means, spring means connected adjacent one of its ends with one of said tubular members and adjacent its opposed end with a portion of the bearing means for urging said tubular members as a unit in one direction, means for retaining said tubular member as a unit against rotation during said sliding movement and means having a remotely operable threaded portion connected with a block secured to one end of pivotally supported bell crank type lever means which is in turn connected adjacent its opposed end with one of said tubular members for moving said tubular members as a unit against the action of the resilient means when said remotely operable threaded portion is operated.

8. An apparatus of the character described comprising a projector having a light source, means for producing a beam of light and means for focusing said beam of light, a pair of substantially normally disposed slideways between said light source and said means for focusing said beam of light, a plate member having a framing opening therein pivotally supported internally of the apparatus adjacent said normally disposed slideways about a pivot having its axis disposed in the direction of the longitudinal axis of the means for focusing the beam of light and means extending inwardly of the apparatus and connected with the plate-like member adjacent one end thereof and having a portion extending outwardly of the apparatus for remotely operating said plate member whereby the framing opening therein may be moved into and out of the beam of light.

WILLIAM F. PECK.
ALBIN A. GRADISAR.